(12) United States Patent
Rajapaksa (10) Patent No.: US 10,389,184 B2
(45) Date of Patent: Aug. 20, 2019

(54) DATA TRANSFER USING BEAMED POWER

(71) Applicant: Intel Corporation, Santa Clara, CA (US)

(72) Inventor: Indrajith Rajapaksa, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 15/253,299

(22) Filed: Aug. 31, 2016

(65) Prior Publication Data

US 2018/0062451 A1    Mar. 1, 2018

(51) Int. Cl.
*H02J 50/80* (2016.01)
*H02J 50/90* (2016.01)
*H02J 50/40* (2016.01)
*H02J 3/38* (2006.01)
*H04L 29/06* (2006.01)
*H02J 50/20* (2016.01)
*H04L 29/08* (2006.01)
*H04W 12/06* (2009.01)

(52) U.S. Cl.
CPC .............. *H02J 50/80* (2016.02); *H02J 3/383* (2013.01); *H02J 50/40* (2016.02); *H02J 50/90* (2016.02); *H04L 63/08* (2013.01); *H02J 50/20* (2016.02); *H04L 67/104* (2013.01); *H04L 67/12* (2013.01); *H04W 12/06* (2013.01); *Y04S 40/18* (2018.05)

(58) Field of Classification Search
CPC ............. H02J 50/40; H02J 50/20; H02J 50/80
See application file for complete search history.

(56) References Cited

U.S. PATENT DOCUMENTS

| | | | | | |
|---|---|---|---|---|---|
| 4,187,506 | A | * | 2/1980 | Frosch | H02J 50/20 342/352 |
| 5,933,263 | A | * | 8/1999 | Kinstler | H04B 10/807 102/207 |
| 5,942,047 | A | * | 8/1999 | Fraas | F23D 91/02 136/253 |
| 6,967,462 | B1 | * | 11/2005 | Landis | H02J 17/00 320/101 |

(Continued)

FOREIGN PATENT DOCUMENTS

| | | |
|---|---|---|
| CN | 203151536 U | 8/2013 |
| CN | 204117187 U | 1/2015 |

(Continued)

OTHER PUBLICATIONS

Dictionary.com, "Definition of Radio Frequency," pp. 1*

(Continued)

*Primary Examiner* — Pinping Sun
(74) *Attorney, Agent, or Firm* — Schwabe, Williamson & Wyatt, P.C.

(57) ABSTRACT

Apparatuses, methods and storage associated with data transfer using beamed power are disclosed herein. In embodiments, an electronic device may include a power beam receiver to harvest power from a beam received from a compute device. The electronic device may include may include one or more processors, devices, and/or circuitry to utilize the harvested power to facilitate at least one of receipt of data from said compute device or transmission of data to said compute device.

6 Claims, 6 Drawing Sheets

(56) References Cited

U.S. PATENT DOCUMENTS

| | | | |
|---|---|---|---|
| 7,696,644 B2* | 4/2010 | Metz | H01F 38/14 |
| | | | 219/203 |
| 8,672,258 B1* | 3/2014 | Tillotson | B64C 1/1484 |
| | | | 244/1 R |
| 8,739,311 B2 | 5/2014 | Wickramasinghe et al. | |
| 8,853,528 B2* | 10/2014 | Sievenpiper | H01L 31/02242 |
| | | | 136/256 |
| 8,922,333 B1* | 12/2014 | Kirkjan | G07C 9/00309 |
| | | | 235/376 |
| 9,312,701 B1 | 4/2016 | Mor et al. | |
| 9,719,851 B2* | 8/2017 | McRae | G01J 1/44 |
| 2002/0014262 A1* | 2/2002 | Matsushita | G08B 13/128 |
| | | | 136/244 |
| 2004/0142733 A1* | 7/2004 | Parise | B01F 5/0614 |
| | | | 455/572 |
| 2005/0001167 A1* | 1/2005 | Garmer | G08B 17/005 |
| | | | 250/347 |
| 2005/0126379 A1* | 6/2005 | Pikus | F42C 17/04 |
| | | | 89/6 |
| 2008/0019082 A1* | 1/2008 | Krieger | B60R 11/0241 |
| | | | 361/601 |
| 2008/0030354 A1* | 2/2008 | Oldenkamp | H01L 31/0504 |
| | | | 340/635 |
| 2008/0121442 A1* | 5/2008 | Boer | G06F 3/0412 |
| | | | 178/18.09 |
| 2009/0272424 A1* | 11/2009 | Ortabasi | H01L 31/0543 |
| | | | 136/246 |
| 2010/0295384 A1* | 11/2010 | Kobayashi | G06F 1/266 |
| | | | 307/154 |
| 2011/0085161 A1* | 4/2011 | Thien | G01N 21/4738 |
| | | | 356/237.3 |
| 2012/0007441 A1* | 1/2012 | John | A61N 1/3785 |
| | | | 307/104 |
| 2013/0057077 A1 | 3/2013 | Rothschild | |
| 2013/0113302 A1* | 5/2013 | Jeong | H02B 15/00 |
| | | | 307/117 |
| 2014/0054961 A1* | 2/2014 | Metcalf | H02J 17/00 |
| | | | 307/19 |
| 2014/0179223 A1* | 6/2014 | Sessink | G07C 9/00309 |
| | | | 455/41.1 |
| 2014/0180851 A1* | 6/2014 | Fisher | G06Q 20/20 |
| | | | 705/16 |
| 2015/0281411 A1* | 10/2015 | Markus | G02C 7/04 |
| | | | 455/556.1 |
| 2015/0326317 A1* | 11/2015 | Michaelis | H04B 10/807 |
| | | | 398/115 |
| 2015/0333799 A1* | 11/2015 | Perry | G10K 11/346 |
| | | | 320/108 |
| 2016/0049831 A1* | 2/2016 | Nakano | H02J 17/00 |
| | | | 307/104 |
| 2016/0127012 A1 | 5/2016 | Shylendra et al. | |
| 2016/0277933 A1* | 9/2016 | Moon | H04W 4/70 |
| 2016/0308614 A1* | 10/2016 | Tsonev | H04B 10/116 |
| 2017/0047790 A1* | 2/2017 | Olsson | H02J 50/20 |
| 2017/0064556 A1* | 3/2017 | Gilad | H04W 4/70 |
| 2017/0214100 A1* | 7/2017 | Kim | G01D 11/30 |
| 2017/0373207 A1* | 12/2017 | Hwang | H01L 31/048 |
| 2018/0034557 A1* | 2/2018 | Alpert | H04B 10/807 |
| 2018/0123403 A1* | 5/2018 | Kare | G01S 17/026 |

FOREIGN PATENT DOCUMENTS

| | | | |
|---|---|---|---|
| CN | 104977873 A | | 10/2015 |
| EP | 2518863 A1 | | 10/2012 |
| JP | 2003346294 A | * | 12/2003 |
| WO | WO 03-036778 A1 | | 5/2003 |

OTHER PUBLICATIONS

Dictionary.com, "Definition of Microwave," pp. 1.*

International Search Report and Written Opinion dated Oct. 27, 2017 for International Patent Application No. PCT/US2017/042877, 15 pages.

Joshua Wright, "Dispelling Common Bluetooth Misconception" SANS Technology Institute, retrieved on Aug. 31, 2016, 4 pages, https://www.sans.edu/research/security-laboratory/article/bluetooth.

Harry Ostaffe et al., "RF-based Wireless Charging and Energy Harvesting Enables New Applications and Improves Product Design," retrieved on Aug. 31, 2016, 3 pages, http://www.mouser.com/applications/rf_energy_harvesting/.

Xin Chen et al., "Design and Evaluation of an Online Anomaly Detector for Distributed Storage Systems," Sep. 21, 2012, 12 pages, USA and China.

Thomas Zahariah et al., "The Internet of Things Has a Gateway Problem," Feb. 12-13, 2015, 6 pages, Santa Fe, New Mexico.

* cited by examiner

DATA TRANSFER USING BEAMED POWER

TECHNICAL FIELD

The present disclosure relates to processor efficiency and more specifically relates to data transfer using beamed power.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The Internet of Things (IoT) is the network of physical objects or "things" embedded with electronics, software, sensors, and network connectivity, which enables these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. Each thing is uniquely identifiable through its embedded computing system but is able to interoperate within the existing Internet infrastructure.

Some IoT applications may involve an IoT device with sensor(s) to gather data, and to provide the sensor data to another device. For instance the IoT device may have limited memory and may need to transfer sensor data to a data consumer to free up memory for additional data gathering, or for other reasons (the IoT device may have a limited user interface and the sensor data may be transferred to another device to display the sensor data or information about the sensor data on a display of another device). However, data transmission, especially data transmission in a secure way, is costly in power usage.

Known schemes for powering secure data transmissions or other operations by the IoT device may not be appropriate for all applications. For instance, a size of the battery needed for powering the IoT device may be too large for some applications. Other schemes for powering the IoT device, such as connecting the IoT device to a constant power source, may also limit its applicability.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with data transfer using beamed power are disclosed herein. In embodiments, an electronic device may include a power beam receiver to harvest power from a beam received from a compute device. The electronic device may include may include one or more processors, devices, and/or circuitry to utilize the harvested power to facilitate at least one of receipt of data from said compute device or transmission of data to said compute device.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
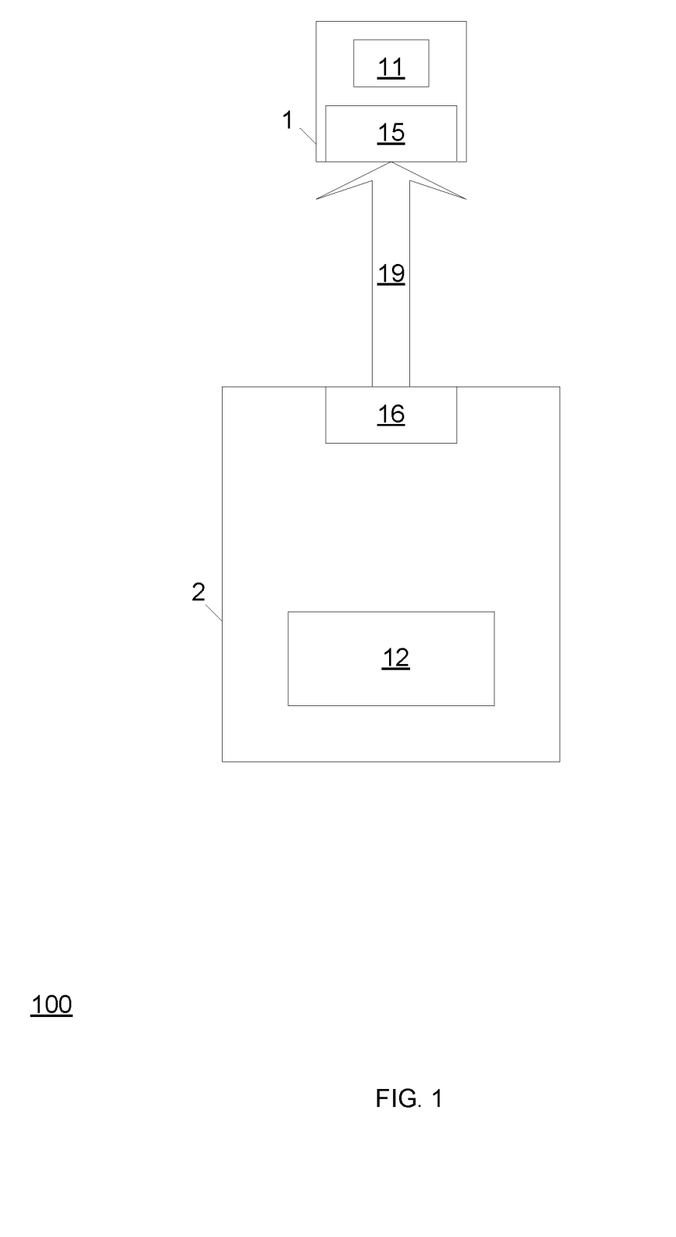
FIG. 1 illustrates an example system equipped with technology for data transfer using beamed power.

FIG. 1 illustrates an example system 100 equipped with technology for data transfer using beamed power. The system 100 may include an electronic device 1, e.g., an IoT device, and a compute device 2, e.g., a portable, mobile device (or some other device). The electronic device 1 may include a receiver 15 to harvest power from a beam 19 (e.g., a direction beam such as a laser beam) received, e.g., from the compute device 2, and circuitry 11 to utilize the harvested power to facilitate at least one of receipt of data from said compute device 2 or transmission of data to said compute device 2. The compute device 2 may include circuitry 12 to extract power from a power source (such as but not limited to a battery (not shown) of the compute device 2), and a transmitter 16 to transmit the beam 19 to deliver a portion of the power to the electronic device 1 for facilitation of data transfer to and/or from the electronic device 1.

In some examples, the receiver 15 may include an antenna to harvest energy and/or a photovoltaic cell. In contrast to other photovoltaic cells such as ones used in solar panels, a photovoltaic cell of the receiver 15 may be a narrowband photovoltaic cell, such as a single frequency photovoltaic cell. The beam 19 may be a directional beam based on laser, IR (infrared), RF (radio frequency), millimeter wave, or the like, or combinations thereof.

In some examples, the electronic device 1 may include sensor(s) and the system 100 may include support for transmitting sensor data collected by the sensor(s) to the compute device 2 in a secure way, e.g., with encryption. The power harvested from the beam 19 may facilitate transmitting of the sensor data collected by the sensor(s) to the compute device 2 in the secure way. In one example, the transmitter 16 may include more than transmitter, e.g., a power beam transmitter and a signal beam transmitter to transmit information including a key usable for authentication. The signal beam transmitter may be an IR transmitter and the key may be represented by a series of IR pulses (e.g., an IR protocol may be used to signal the value), in some examples. In some examples, these transmitters may be integrated into a single package, e.g., a dual beam transmitter. Information for authenticating based on the key may be preprogrammed by combination of the electronic device 1 and user interaction (button press, toggle switch, or some other user interface of the electronic device 1, which may load information into the access list in the local memory of the electronic device 1).

The circuitry 11 may include a processor to recognize a key in the beam 19, and to authenticate the compute device 2 using the key prior to utilization of a transceiver of the circuitry 11 to transmit data (for instance sensor data) to the compute device 2. Authentication may include comparing a value of the key to information in an access list maintained in a local memory of the electronic device 1. The transceiver may include support for a point to point data communication protocol, such as, but not limited to, a Bluetooth® transceiver (likewise, the circuitry 12 may include a transceiver with support for the point to point data communication protocol.) Use of the circuitry 11 (for instance use of the transceiver of the circuitry 11) may be powered, e.g., fully powered or partially powered, using the harvested power from the beam 19.

In some examples, a component of the transmitter 16 may be part of an accessory attached to an interface of the compute device 2, for example USB® (Universal Serial Bus) interface. For example, a power beam transmitter of the transmitter 16 may be part of a power beam transmitter accessory. The power beam transmitter accessory may include an interface to dock with the compute device 2 and draw power over the interface. Another component of the transmitter 16 (e.g., an IR transmitter for sending the key) may be integrated into the compute device 2. In other examples, the entire transmitter 16 may be integrated into the compute device 2. Similarly, a component of the receiver 15 may be part of an accessory attached to an interface of the electronic device 1 (for example, a power beam receiver of the receiver 15 may be part of a power beam receiver accessory).

The circuitry 12 may include a processor to request a connection to the electronic device 1 by sending, e.g., simultaneously sending, a signal beam representing a key and a power beam to facilitate establishment of a secure connection with the electronic device 1 according to a point to point data communication protocol. Energy harvested from the power beam may also be used to transmit data to the compute device 2 using the secure connection. For instance, the power beam of beam 19 may be transmitted until completion of the data transmission, or some other time.

The power beam of beam 19 and the data transmission may use two different physical channels, which means there may be little or no interference between these transmissions, or between the system 100 other systems in close proximity to system 100. In some examples, the power beam and another transmission (e.g., the signal beam and/or a signal of the data transmission) may be different wavelengths. For instance, the signal beam and/or a signal of the data transmission may be in the IR-UV (ultraviolet) spectrum, and the power beam may be RF power. The signal beam and/or a signal of the data transmission may have a wavelength(s) in a range of 300-1500 nm, and the power beam may have a wavelength outside this range, in some examples. In some examples, the signal beam is any direction beam from the IR to the UV spectrum, millimeter wave, directional sound, or the like, or combinations thereof.

In some examples, the transmitter 16 may be to emit a single frequency and directional power beam of beam 19, which may limit power usage of a power source of the compute device (e.g., a battery in examples where compute device 2 is battery powered).

Figure 2:
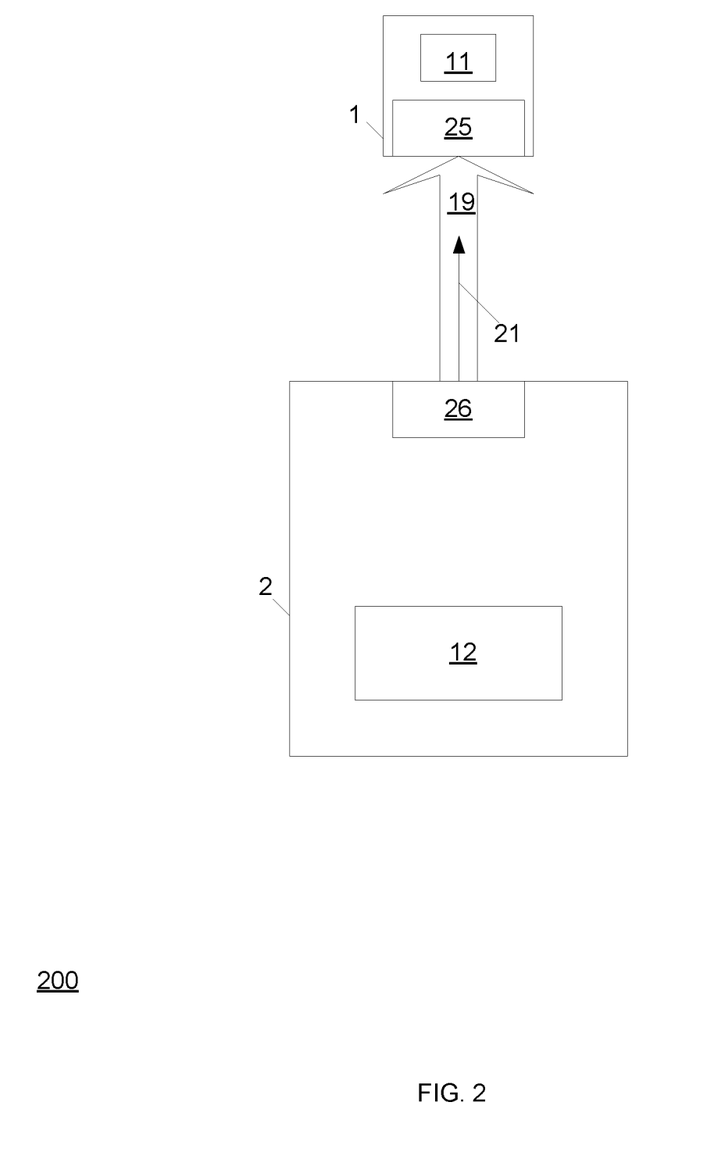
FIG. 2 illustrates an example of another system similar to the system of FIG. 1, with a dual beam receiver, according to various embodiments.

FIG. 2 illustrates an example of another system 200 similar to the system 100 of FIG. 1, with a dual beam receiver 25, according to various embodiments. The dual beam receiver 25 may be configured to receive a beam 19 that includes a signal beam 21 from transmitter 26. Likewise, transmitter 26 may be a dual beam transmitter to simultaneously transmit a power beam of beam 19 and the signal beam 21 (e.g., an integrated beam).

Figure 3:
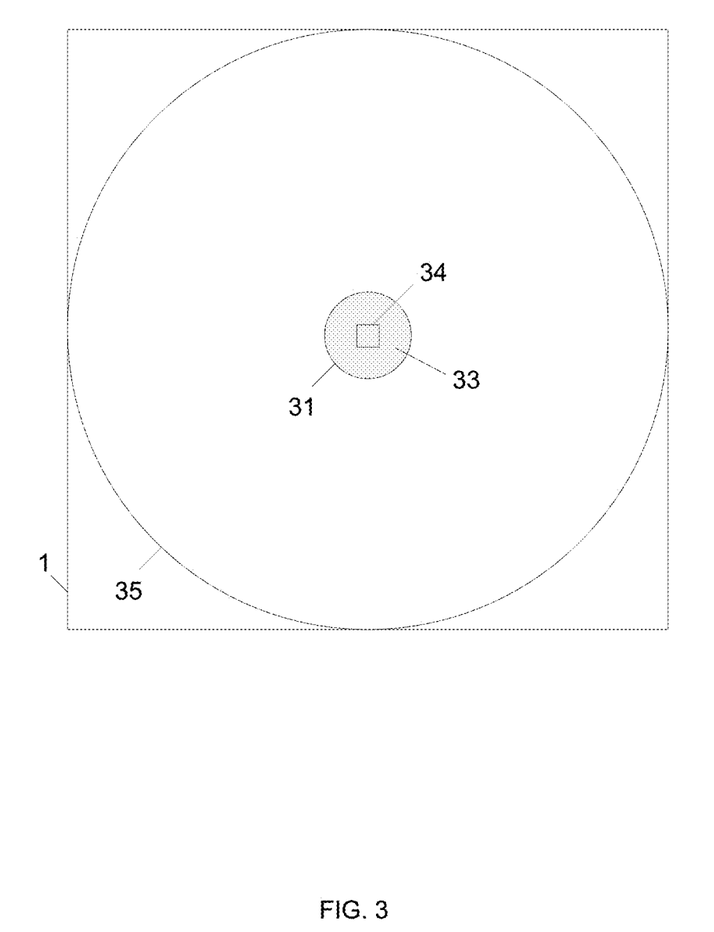
FIG. 3 is a front view of a side of the electronic device to which the dual beam receiver of FIG. 2 is attached.

FIG. 3 is a front view of a side of the electronic device 1 to which the dual beam receiver 25 is attached. In the illustrated example, the dual beam receiver 25 (FIG. 2) includes a photovoltaic cell 35 having an opening 31.

A signal beam receiver, such as an IR sensor 34, may be located inside the opening 31. Also, a filter 33, e.g., a band filter, may cover the opening and/or may be located in the opening to cover the IR sensor 34. The filter 33 may be selected to block a first wavelength associated with a power beam of the beam 19 and to pass a second wavelength associated with the signal beam 21.

The photovoltaic cell 35 is illustrated as round with the opening 31 in the center, but in other examples the photovoltaic cell 35 may be a different shape and/or the opening 31 may be located anywhere on the photovoltaic cell 35. Also, in the illustrated example, the photovoltaic cell 35 is smaller than a side of the electronic device 1; however, in other examples the photovoltaic cell 35 may be the same size, or larger. Also, in the illustrated example, the photovoltaic cell 35 exposes a portion of the side of the electronic device 1, but in other examples a same size or larger photovoltaic cell 35 may not expose any portion of the side of the electronic device 1.

Figure 4:
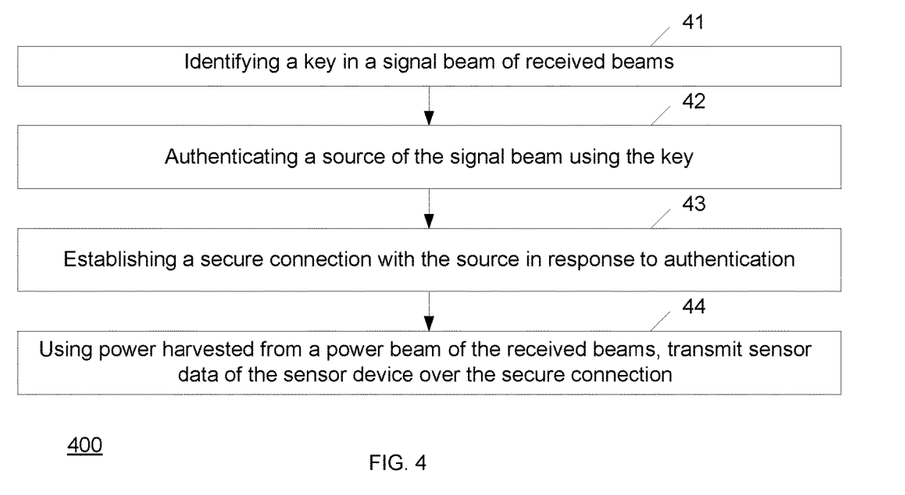
FIG. 4 is a flow chart showing a process of powering a sensor device using a compute device to securely obtain sensor data from the sensor device that may be performed by any electronic devices described herein.

FIG. 4 is a flow chart showing a process 400 of powering a sensor device using a compute device to securely obtain sensor data from the sensor device, which may be performed by any electronic devices described herein. In block 41, the electronic device may identify a key in a signal beam of received beams. In some examples, a predetermined signal may be included in the signal beam preceding the key. For instance, in an IR-based signal beam receiver example, a predetermined signal of an IR protocol (e.g., a predetermined combination of IR pulses as per the protocol) may be used to signal that a next series of pulses represents key. The key may be recovered from the portion of the signal beam following the predetermined signal, e.g., recovered from a portion of the series of pulses corresponding to the key.

In block 42, the electronic device may authenticate a source of the signal beam using the key. In some examples, the electronic device may compare a recovered value of the key to stored data maintained in a local memory of the electronic device, e.g., compare the recovered value to value(s) of the access list (described previously). The source may be authenticated responsive to a match of the recovered value(s) to the value(s) of the stored data.

In block 43, the electronic device establishes a secure connection with the source in response to authentication. In block 44, the electronic device uses power harvested from a power beam of the received beams to transmit sensor data of the sensor device over the secure connection. For instance, the electronic device may include a photovoltaic cell, an antenna, or the like, or combination thereof, which may receive a power beam. Circuitry corresponding to the photovoltaic cell, the antenna, or the like, or combination thereof, may output electrical power. A transmitter and/or receiver of the electronic device and/or circuitry thereof may consume the output power directly and/or through an intermediary device that temporarily stores the output electrical power. An intermediary device may include a primary energy source (such as a main battery, or an auxiliary energy storage device (such as a capacitor which may or may not be dedicated to the circuitry corresponding to the photovoltaic cell, an antenna, or the like, or combination thereof).

Figure 5:
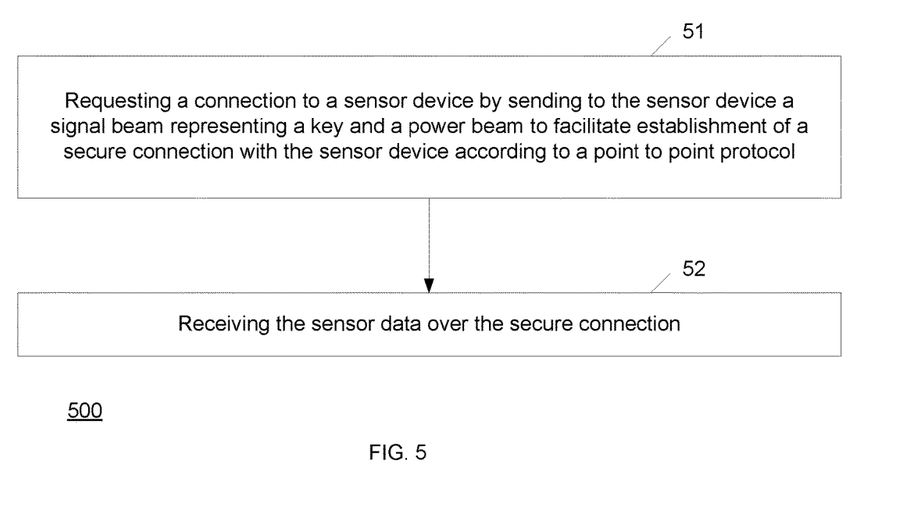
FIG. 5 is a flow chart showing a process of securely obtaining sensor data from a sensor device that may be performed by any compute device described herein.

FIG. 5 is a flow chart showing a process 500 of securely obtaining sensor data from a sensor device, which may be performed by any compute devices described herein. In block 51, the compute device may request a connection to a sensor device by sending to the sensor device a signal beam representing a key and a power beam to facilitate establishment of a secure connection with the sensor device according to a point to point protocol. In some embodiments, the signal beam and the power beam may be sent simultaneously. In block 52, the compute device may receive the sensor data over the secure connection.

Figure 6:
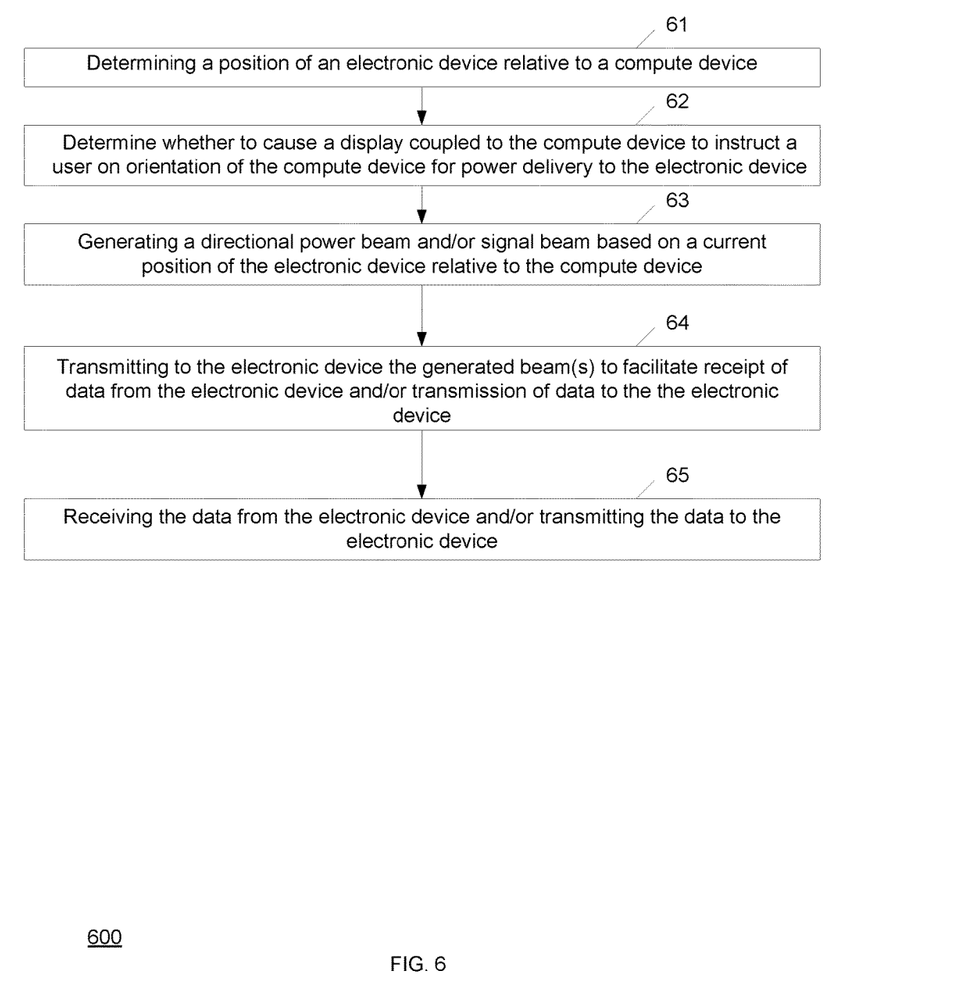
FIG. 6 is a flow chart showing another process that may be performed by any compute device described herein.

FIG. 6 is a flow chart showing another process that may be performed by any compute device described herein. In block 61, the compute device may determine a position of an electronic device relative to the compute device. Circuitry to determine the position may include location identification circuitry (e.g., RFID circuitry) to collect information from an identifier of the electronic device (e.g., an RFID tag on the electronic device), or some other circuitry to identify a position of an electronic device relative to a compute device.

In block 62, the compute device may determine whether to cause a display coupled to the compute device to instruct a user on orientation of the compute device for power delivery to the electronic device. For instance, in the case of an IoT device, a user need not know where the IoT device is located (which may be small and/or one of many) in order to transmit data to or receive data from the IoT device. Transmitting a firmware update to an IoT device may involve reception by the IoT device of an encrypted transmission by the IoT device (to avoid exposing the IoT device to installation of unknown software such as malware).

In examples utilizing the process of block 62, the compute device may determine to skip instruction of the user based on the position identified by the compute device and/or some other information. For instance, the instruction may be skipped if the position of the electronic device related to the compute device is already acceptable for transmission of the power and/or signal beams. In other examples, the compute device may be compatible with multiple types of electronic devices with different power beam receivers and/or signal beam receivers, and in such a case, the compute device may determine to skip the instruction of the user in response to determining that the electronic device to be signaled corresponds to a predetermined type. For example, the user instruction may be displayed if the electronic device corresponds to a first type associated with an IR-based signal beam receiver, or some other line of sight receiver. The user instruction may be skipped if the electronic device corresponds to a second type of receiver associated with an RF-based receiver (or some other receiver that is not line of sight).

In block 63, the compute device may generate a directional power beam and/or a signal beam based on a current position of the electronic device relation to the compute device. For instance, if the electronic device includes an antenna-based power beam receiver, the compute device may perform beam shaping based on the current position to maximize power efficiency of the transfer, minimize interference, or for any other reason. Similarly, if the electronic device includes an RF-based signal beam receiver, it may be desirable to perform beam shaping to direct the signal beam to the current position for similar reasons.

The compute device may include a power beam generator to generate a combined beam. The beam combiner may include a fiber combiner and/or an optical combiner. The current position may be the determined position or a new position based on orientation by the user as instructed by a displaying. In block 64, the compute device may transmit to the electronic device the generated beam(s) to facilitate receipt of data from the electronic device and/or transmission of data to the electronic device. In block 65, the compute device may receive the data from the electronic device and/or transmit the data to the electronic device.

Figure 7:
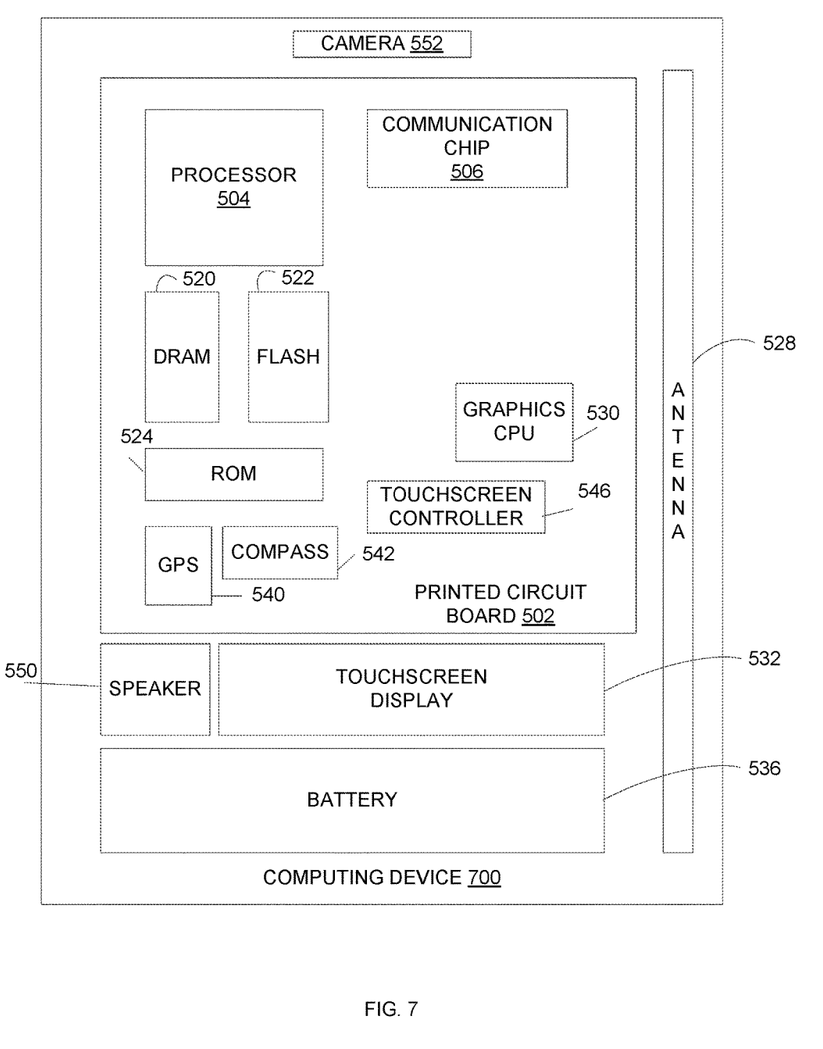
FIG. 7 illustrates an example computing device that may employ the apparatuses and/or methods described herein, according to various embodiments.

FIG. 7 illustrates an example device 700 that may employ the apparatuses and/or methods described herein, according to various embodiments (for instance, any apparatus and/or method associated with any compute device or electronic device described earlier with respect to FIGS. 1-6). As shown, device 700 may include a number of components, such as one or more processor(s) 504 (one shown) and at least one communication chip 506.

In various embodiments, the one or more processor(s) 504 each may include one or more processor cores. In various embodiments, the at least one communication chip 506 may be physically and electrically coupled to the one or more processor(s) 504. In further implementations, the communication chip 506 may be part of the one or more processor(s) 504. In various embodiments, computing device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, a memory controller (not shown), volatile memory (e.g., dynamic random access memory (DRAM) 520), non-volatile memory such as read only memory (ROM) 524, flash memory 522, an I/O controller (not shown), a digital signal processor (not shown), a crypto processor (not shown), a graphics processor 530, one or more antenna 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or a storage device (not shown) may include associated firmware (not shown) storing programming instructions configured to enable computing device 500, in response to execution of the programming instructions by one or more processor(s) 504, to practice all or selected aspects of the methods described herein. For example, the programming instructions may implement the earlier described circuitry of any compute device or electronic device described with reference to the respective ones of FIGS. 1-6. In various embodiments, these aspects may additionally or alternatively be implemented using hardware separate from the one or more processor(s) 504, flash memory 512, or storage device 511.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 5G, 5G, and beyond. The computing device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computing device 500 may be a wearable device, a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 500 may be any other electronic device that processes data.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

An electronic device or compute device employing the apparatuses and/or methods described herein may be utilized in a wide variety of applications. For instance, in a data logger application, a system may include a lower power data logger and a compute device having a processor to combine first data with second data of the low power data logger. The compute device may include one or more transmitters to transmit, to the lower power data logger, a signal beam and a power beam to deliver power to the low power data logger to facilitate extraction of the second data from the low power data logger.

The first data may be generated by another data logger or by said low power data logger prior to a time of generation of the second data. In other examples, the first data is generated by the processor or a component of a same compute device as the processor.

The one or more transmitters may comprise an accessory to a compute device in which the processor operates. In some example, the one or more transmitters comprise a dual beam transmitter is integrated into the compute device.

Applications of the apparatuses and/or methods described herein may include (but are not limited to): a wearable IoT device data transfer; data transfer from IoT sensors and/or data loggers in homes placed in attics, ceilings, or other hard to access places; data transfer from IoT factories sensors and/or data loggers in hard to access places; data transfer hazards sites (e.g., nuclear, sewage, or other places where it would not be convenient to draw specific power lines or keep replacing the battery often; data transfer from self-powered IoT devices using thermal, piezo based energy harvesting, wherein there is not enough power for a point to point data transfer.

In some examples, the apparatuses and/or methods described herein are not a total replacement for RF power harvesting, but may be applied as a fallback or auxiliary power source in settings where it may be unfeasible to have RF power harvesting or to have RF power harvesting alone, respectively. The apparatuses and/or methods described may be more appropriate than RF power harvesting or RF power harvesting alone where accessibility and convenience are important factors.

EXAMPLES

Example 1 is an apparatus for harvesting power from a beam received from a compute device. The apparatus may include an electronic device, comprising: a power beam receiver to harvest power from a beam received from a compute device; and circuitry to utilize the harvested power to facilitate at least one of receipt of data from said compute device or transmission of data to said compute device.

Example 2 includes the subject matter of example 1, and the power beam receiver includes at least one of an antenna to harvest energy or a photovoltaic cell.

Example 3 includes the subject matter of any of examples 1-2, and the circuitry comprises a transceiver with support for a point to point data communication protocol.

Example 4 includes the subject matter of any of examples 1-3, and the beam includes a power beam and a signal beam, and wherein the power beam receiver includes a photovoltaic cell having an opening and an IR (infrared) sensor located in the opening, the IR sensor to receive the signal beam.

Example 5 includes the subject matter of any of examples 1-4, and a filter to cover the opening, the filter to block a first wavelength associated with the power beam and to pass a second wavelength associated with the signal beam.

Example 6 includes the subject matter of any of examples 1-5, and the power comprises RF (radio frequency) power.

Example 7 includes the subject matter of any of examples 1-6, and the power beam comprises a directional beam based on at least one of laser, IR, RF, or millimeter wave.

Example 8 includes the subject matter of any of examples 1-7, and the power beam receiver comprises a single frequency photovoltaic cell.

Example 9 includes the subject matter of any of examples 1-8, and a processor to recognize a key in the beam and to authenticate the compute device using the key prior to utilization of a transceiver of the circuitry to transmit data to the compute device.

Example 10 includes the subject matter of any of examples 1-9, and the electronic device is an Internet-of-Thing (IoT) device.

Example 11 includes an apparatus to beam power to an electronic device. The apparatus may include circuitry to extract power from a power source; one or more transmitters coupled to the circuitry to transmit a signal beam to transfer data to an electronic device and a power beam to deliver a portion of the power to the electronic device for facilitation of at least one of the data transfer to the electronic device or a data transfer from the electronic device.

Example 12 includes the subject matter of example 11, and the circuitry includes an interface to dock with a portable, mobile compute device to draw the power from the portable, mobile compute device.

Example 13 includes the subject matter of any of examples 11-12, and information represented by the signal beam includes a key usable for authentication.

Example 14 includes the subject matter of any of examples 11-13, and a wireless receiver to receive data from the electronic device by a point to point data communication protocol.

Example 15 includes the subject matter of any of examples 11-14, and the one or more transmitters to simultaneously transmit the power beam and the signal beam.

Example 16 is a method of securely obtaining sensor data from a sensor device, the method comprising. The method may include: requesting, by a compute device, a connection to the sensor device by sending to the sensor device a signal beam representing a key and a power beam to facilitate establishment of a secure connection with the sensor device according to a point to point data communication protocol; and receiving the sensor data over the secure connection; and receiving, by the compute device, the sensor data over the secure connection.

Example 17 includes the subject matter of example 16, and the compute device is a portable, mobile device or an accessory thereof.

Example 18 includes the subject matter of any of examples 16-17, and determining, by a compute device, a position of the sensor device relative to the compute device; and generating, by a compute device, at least one of the power beam or the signal beam based on the determined position.

Example 19 includes the subject matter of any of examples 16-18, and determining, by a compute device, a position of the sensor device relative to the compute device; and causing, by a compute device, a display coupled to the compute device to instruct a user on orientation of the compute device for power delivery.

Example 20 includes the subject matter of any of examples 16-19, and displaying, by a compute device, the sensor data using a display coupled to the compute device.

Example 21 is a system for combining first data with second data of a low power data logger. The system may include a processor to combine first data with second data of a low power data logger; and one or more transmitters to transmit, to the lower power data logger, a signal beam and a power beam to deliver power to the low power data logger to facilitate extraction of the second data from the low power data logger.

Example 22 includes the subject matter of example 21, and the first data is generated by another data logger or by said low power data logger prior to a time of generation of the second data.

Example 23 includes the subject matter of any of examples 21-22, and the first data is generated by the processor or a component of a same compute device as the processor.

Example 24 includes the subject matter of any of examples 21-23, and the one or more transmitters comprise an accessory to a compute device in which the processor operates.

Example 25 includes the subject matter of any of examples 21-24, and the one or more transmitters comprise a dual beam transmitter is integrated into a compute device in which the processor operates.

Example 26 is an electronic device, comprising: means for harvesting power from a beam received from a compute device; and means for transmitting and/or receiving data to and/or from a compute device using the harvested power.

Example 27 includes the subject matter of example 26, and the beam includes a power beam and a signal beam.

Example 28 includes the subject matter of any of examples 25-26, and the power comprises RF (radio frequency) power.

Example 29 includes the subject matter of any of examples 25-27, and the power beam comprises a directional beam based on at least one of laser, IR, RF, or millimeter wave.

Example 30 includes the subject matter of any of examples 25-28, and means for recognizing a key in the beam; and means for authenticating the compute device using the key prior to transmission and/or reception of data to and/or from the compute device.

Example 31 includes the subject matter of any of examples 25-29, and the electronic device is an Internet-of-Thing (IoT) device.

What is claimed is:

1. An electronic device, comprising:
a power beam receiver to harvest power from a beam received from a compute device; and
circuitry to utilize the harvested power to facilitate at least one of receipt of data from the compute device or transmission of data to the compute device;
wherein the beam includes a power beam and a signal beam, and wherein the power beam receiver includes a photovoltaic cell having an opening and a signal beam receiver located in the opening, the signal beam receiver to receive the signal beam, and wherein the electronic device further comprises a filter to cover the opening, the filter to block a first wavelength associated with the power beam and to pass a second wavelength associated with the signal beam.

2. The electronic device of claim 1, wherein the circuitry comprises a transceiver with support for a point to point data communication protocol.

3. The electronic device of claim 1, wherein the photovoltaic cell is a single frequency photovoltaic cell.

4. The electronic device of claim 1, wherein the electronic device is an Internet-of-Thing (IoT) device.

5. An electronic device, comprising:
a power beam receiver to harvest power from a beam received from a compute device; and
circuitry to utilize the harvested power to facilitate at least one of receipt of data from the compute device or transmission of data to the compute device;
wherein the beam includes a power beam and a signal beam, and wherein the power beam receiver includes a photovoltaic cell having an opening and an infrared (IR) sensor located in the opening, the IR sensor to receive the signal beam, and wherein the electronic device further comprises a filter to cover the opening, the filter to block a first wavelength associated with the power beam and to pass a second wavelength associated with the signal beam.

6. The electronic device of claim 5, wherein the electronic device is an Internet-of-Thing (IoT) device.

\* \* \* \* \*